INTEGER ANALYZER AND SEQUENCE DETECTOR

Filed Sept. 20, 1957 3 Sheets-Sheet 1

INVENTORS U. S. BERGER
M. COCCHIARO
BY H. O. Wright
ATTORNEY

PULSE DISTRIBUTOR

PULSE INTEGRATOR

INVENTORS: U.S. BERGER
M. COCCHIARO
BY
H. O. Wright
ATTORNEY

INVENTORS: U.S. BERGER
M. COCCHIARO
BY H. O. Wright
ATTORNEY

United States Patent Office 2,929,048

Patented Mar. 15, 1960

2,929,048

INTEGER ANALYZER AND SEQUENCE DETECTOR

Uriah S. Berger, Andover, Mass., and Michael Cocchiaro, Summit, N.J., assignors to Bell Telephone Laboratories, Incorporated, New York, N.Y., a corporation of New York Application September 20, 1957, Serial No. 685,333

5 Claims. (Cl. 340—164)

This invention relates generally to selective signaling systems. More particularly, it relates to the provision of simple, compact, economical facilities whereby any one of a large number of stations can selectively call any specific one only of the other stations.

A principal object of the invention is, accordingly, to facilitate the establishment of communication between any station of a large number of stations and any specific other station of said large number with which the operator of the first mentioned station may wish to communicate.

Another object is to provide, in the receiving equipment of each station, simple, reliable and economical code analyzing and recognition apparatus which will actuate a local call device such as a bell or signal light only when a received call code is that assigned to said station.

To enhance the overall simplicity of systems operating in accordance with the principles of the invention they are, in one form, designed to utilize at each station of the system a conventional telephone dial to originate a plurality of pulse groups to represent a like plurality of integers, the pulse groups being selected and arranged in specific sequential order to represent any of numerous specific call codes or numbers which are assigned to other stations of the system. Thus any station of such a system can call any other station by simply dialing the call or code number assigned to the other station. In this form of system all stations may, obviously, be mobile and there is no necessity for a fixed "central" station through which communication between two mobile stations is established. In the latter form of system the "central" station only could, of course, employ the transmitting equipment for radiating the dial pulse call codes and each mobile station would then need only the pulse code recognition receiving equipment to respond to its assigned code number. Each mobile station could then call the "central" station by a simple tone signal in accordance with systems well known in the art and request the central station to radiate the pulse code number of another mobile system with which it is desired to establish communication. Obviously, the use of a "central" station, while effecting an economy in the required transmitting equipment for the mobile stations, sacrifices an appreciable part of the extreme flexibility afforded by systems in which any station can call any other station. Specific operating requirements will, obviously, determine which type of system should be used.

At all mobile stations the receiving circuits must, of course, analyze all call codes received and respond by actuating a local call signal, such as a bell or signal light, only when the call code assigned to the specific receiving station is received.

In the specific illustrative embodiment of the invention, described in detail hereinunder, it will be found that a multi-station mobile radio communication system of the type which employs no fixed "central" station is selected to exemplify the principles of the invention.

The transmitting equipment for each mobile radio station is designed, as will be described in detail, to respond to dial pulses from a conventional telephone dial to emit tone modulated radio frequency pulses.

The receiving equipment for each mobile radio station is designed, as will also be described in detail, to receive and demodulate the radio frequency pulses to tone pulses which are then detected to provide pulses corresponding to the original dial pulses.

A pulse code "discriminator" in the receiving equipment analyzes the received pulses and if the integers and the sequence in which they are received correspond with the code number assigned to the receiving station, a bell is actuated to notify the operator of the receiving station that the call code of that specific station has been received. The discriminator includes a number of safeguards against possible false actuation of the bell as will be described in detail hereinunder.

The design of the overall system is based upon the use of conventional apparatus units all well known to those skilled in the art. A particular feature of the "discriminator" is that the code number to which it will respond can be readily changed by changing a relatively few circuit connections so that cards of the "printed circuit" type can be readily adapted for use in these circuits.

The various objects, features, advantages and principles of the invention including those mentioned above and others will become apparent during the following detailed description of a specific illustrative system embodying arrangements of the invention and from the appended claims.

Figure 4:
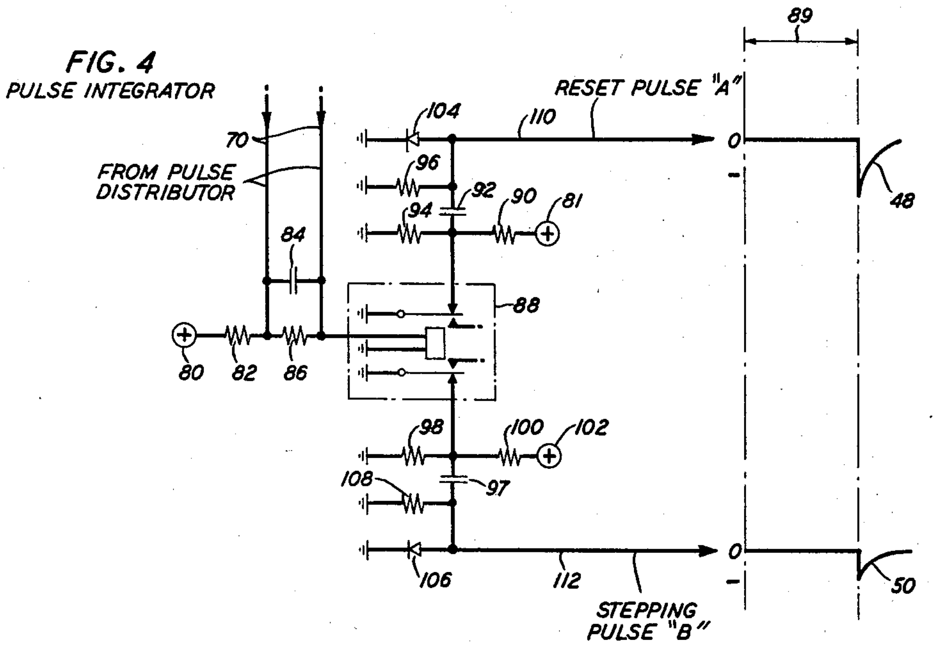
Figure 5:
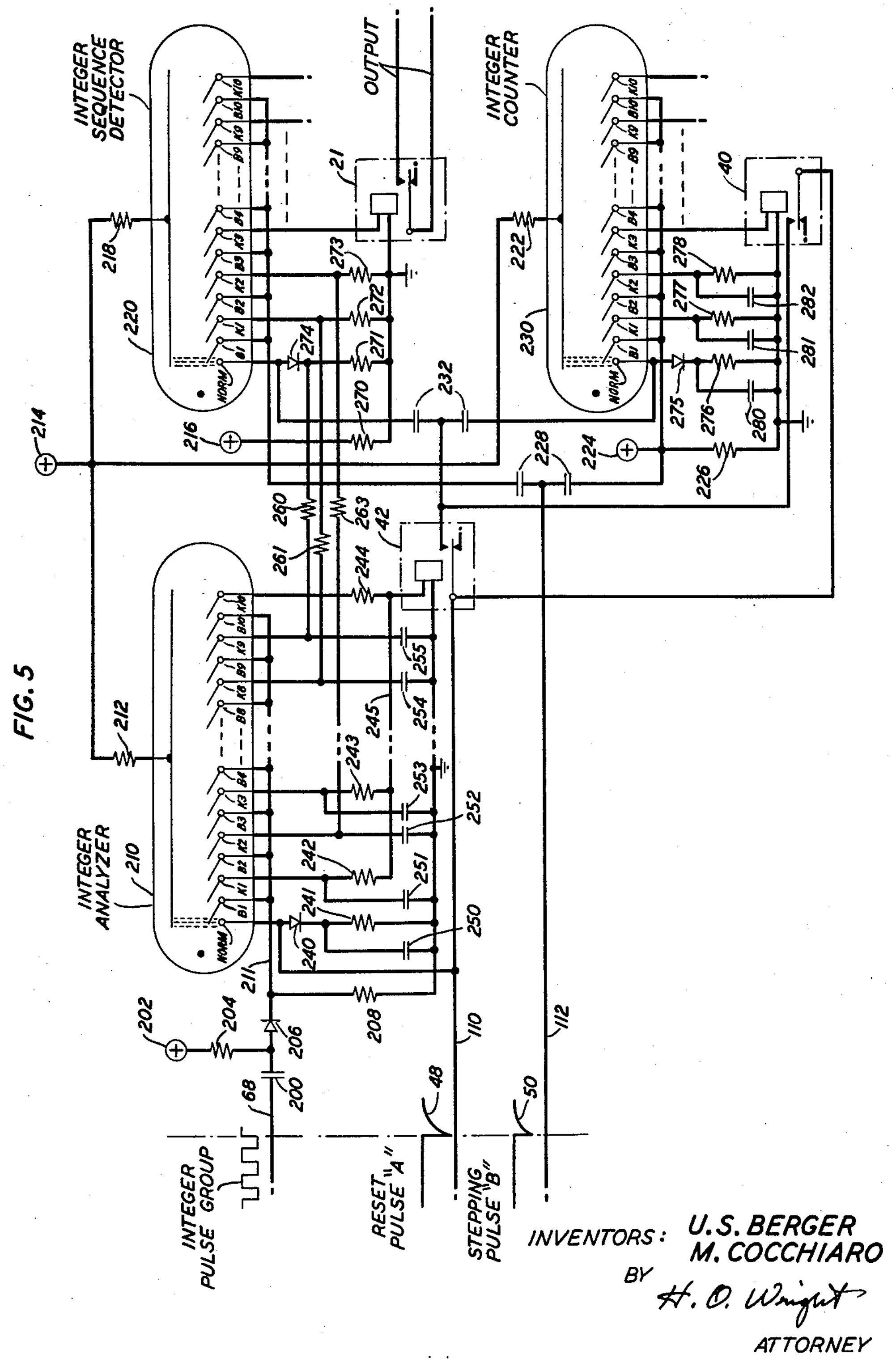

Fig. 4 is an electrical schematic diagram of the pulse integrator circuit for deriving the reset pulse and the stepping pulse, respectively, shortly after the termination of each integer pulse group; and Fig. 5 is an electrical schematic diagram of the pulse code discriminator circuit portions comprising an integer analyzer, an integer sequence detector, and an integer counter, arranged in accordance with a form of the invention.

Figure 1:
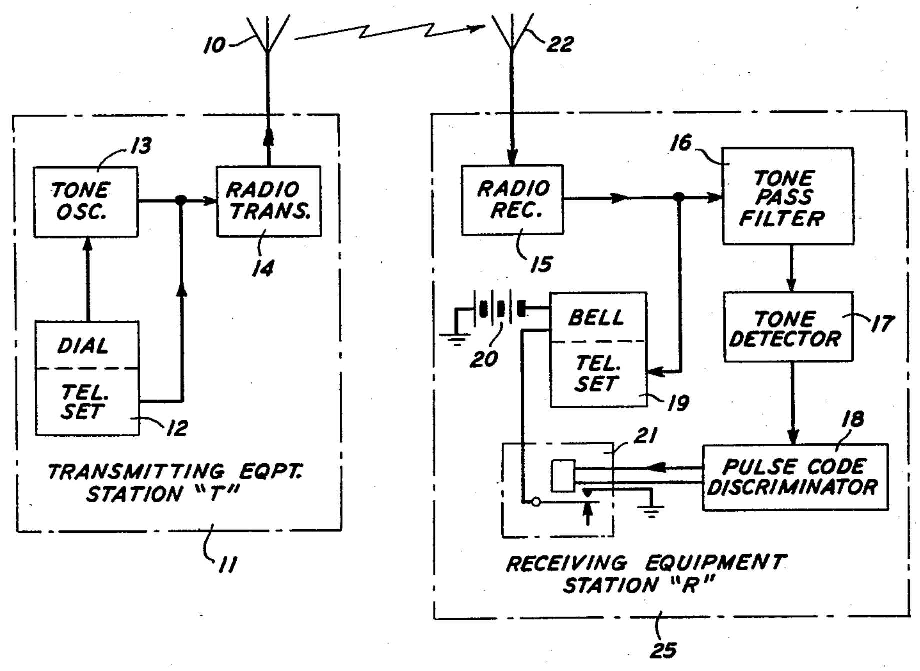
Fig. 1 represents, in block schematic diagram form, a selective signaling system utilizing radio transmission of pulse groups originating at a conventional telephone dial.

In more detail in Fig. 1, the selective signaling transmitting equipment 11 of the first mobile radio station designated station T, and the selective signaling receiving equipment 25 of a second mobile radio station designated station R, are shown in block schematic diagram form. The diagrams are simplified to the extent that no receiving facilities are indicated at station T and no transmitting facilities are shown at station R.

While not required for the purposes of the present description, and consequently not disclosed, in order to simplify the drawing, it is to be understood that ordinarily the full equipment of each mobile station of a system not based upon the use of a "central" station will include both sending and receiving signaling equipment and as well equipment for carrying on a two-way radio telephone conversation with any other station of the system when a calling station operator has alerted the operator at a specific called station by use of the selective signaling system as will be described in detail hereinunder.

In the diagram of Fig. 1, the transmitting equipment 11 at station T comprises a telephone set 12 which includes a conventional telephone dial, a tone oscillator 13, a radio transmitter 14, and an antenna 10.

The conventional telephone dial of set 12 is used to generate by successive operation of the dial the integer pulse groups corresponding to the successive integers or digits of a number or code of a remote radio station with which it is desired to establish communication.

In the pulse code, obviously, each integer or digit of the code number is represented by a group of regularly recurrent, substantially identical, and evenly spaced direct current dial pulses, the number of pulses in a specific group corresponding to the numerical value or magnitude of the specific integer. The pulse groups representing the integers of the code number should, of course, be in the same sequential order as the integers of the code number they respectively represent.

Each integer pulse group pulse modulates the tone frequency of oscillator 13. The tone frequency pulses in turn are impressed on a radio frequency carrier provided by radio transmitter 14 and transmitted via antenna 10 to antenna 22 of a distant mobile radio station R having receiving equipment 25, which includes radio receiver 15. At the receiving station the demodulated tone pulse groups are applied to a tone pass filter 16. The output of this filter is applied to a tone detector 17. Through this detector the dial pulses are reproduced and applied to the input of a pulse code discriminator circuit 18. The discriminator circuit 18 "examines" each code number, as represented by an appropriate plurality of integer pulse groups transmitted in sequence, and operates a call signal device only if the pulse groups and the sequence of their occurrence correspond to those required for the call number or code assigned to the receiving station.

The call signal device is represented by the section of the telephone set 19 designated "bell."

Upon receipt of the correct code arrangement of integer pulse groups for the code number assigned to the particular receiving station, discriminator 18 operates relay 21 which closes the circuit including battery 20 and the previously mentioned bell of telephone set 19, thus actuating the bell.

Figure 2:
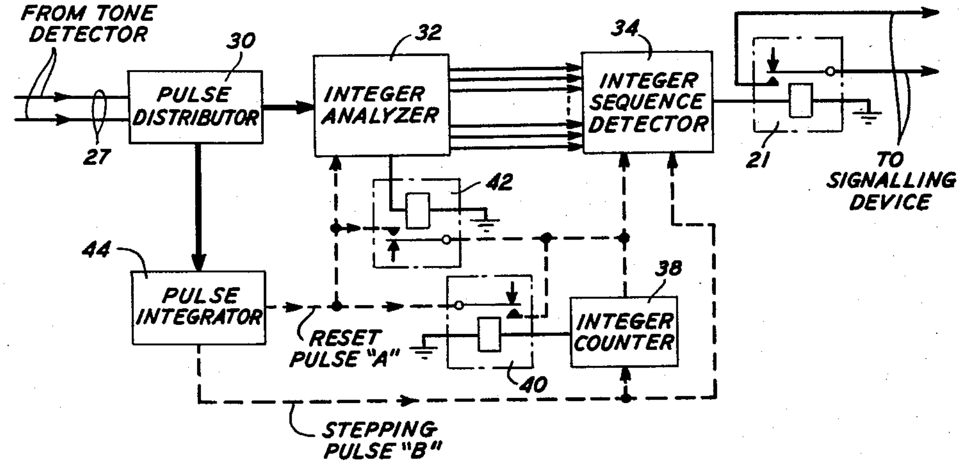
Fig. 2 represents in block schematic diagram form a pulse code discriminator circuit in accordance with the invention.

In Fig. 2 a schematic block diagram of a circuit suitable for "discriminator" 18 of Fig. 1 is shown, and comprises a pulse distributor 30, a pulse integrator 44, an integer analyzer 32, an integer sequence detector 34, an integer counter 38, and relays 21, 40 and 42, all of said apparatus units being interconnected as shown. A suitable electrical schematic diagram of a circuit for the pulse distributor 30 is shown in detail in Fig. 3; that for the pulse integrator 44 is shown in detail in Fig. 4; and that for the remaining units of Fig. 2 is shown in detail in Fig. 5. Consequently, the initial discussion of the diagram of Fig. 2 will be limited to indicating the general functions and interrelations of the components.

Pulse distributor 30, in effect, passes on replicas of the integer pulse groups received from the tone detector 17 of Fig. 1 to the integer analyzer 32 and to the pulse integrator 44.

Pulse integrator 44 provides two negative output pulses, 48 and 50 of Fig. 4, designated reset pulse A and stepping pulse B, respectively, shortly after the completion of each integer pulse group.

Integer analyzer 32 is a stepping switch device (a preferred form being a conventional, multicathode, common-anode, gas-filled tube, as will be presently described in detail) operated as a counting device to count the pulses in each integer pulse group as it is received. Shortly after the completion of the counting of each integer pulse group, the reset pulse A, provided by pulse integrator 44, resets the integer analyzer 32 to its initial or zero condition in preparation for counting the next integer pulse group which is received.

If any integer pulse group is received which does not correspond to any integer of the code number assigned to the receiving station, the integer analyzer 32 operates relay 42 which, shortly after the completion of the pulse group, applies the reset pulse A from integrator 44 to detector 34 and counter 38, erasing any information they may have stored and placing the entire discriminator circuit in condition to respond to its appropriate code number should the latter be received thereafter.

The integer one is reserved as a resetting signal to clear the discriminator circuits of any information which may have been stored as a result of the prior reception of a portion only of the integers of the code number assigned to the particular receiving station. All code numbers accordingly employ the integer one as the first integer of the code number.

If a particular integer pulse group corresponds to any integer of the integers present in the call code number assigned to the receiving station, a signal is passed to a particular step of the integer sequence detector 34, the particular step in the detector 34 being determined by the sequential relation which the particular integer should occupy in the assigned code number.

Pulse integrator 44 also provides, simultaneously with the reset pulse A, shortly after the completion of each integer pulse group, a stepping pulse B to the integer sequence detector 34 and the integer counter 38.

If the integer pulse group which has just been received and counted by analyzer 32 corresponds to an integer of the assigned code number of the receiving station and is in its appropriate position or sequence for the assigned code number, the combined action of the signal passed to detector 34 from analyzer 32 and the stepping pulse B causes the detector 34 to advance one step.

If the immediately preceding received integer pulse group corresponds to an integer of the assigned code number of the receiving station but is not in its appropriate position or sequence for the assigned code number, the stepping pulse B following the completion of the integer pulse group will have no effect upon detector 34.

As long as a sequence of integer pulse groups all of which correspond to integers of the assigned code number of the receiving station are being received, whether or not they are in the sequence required by the assigned code number, the integer counter 38 will be stepped forward one position for each integer received, until it has "counted" to the number of integers contained in the code number assigned to the receiving station whereupon counter 38 will operate relay 40 applying reset pulse A to itself and detector 34, thus reconditioning the complete discriminator circuit to respond to the assigned code number should it then be received.

If the proper number of appropriate integers in appropriate sequence for the assigned code number are received, detector 34 will operate relay 21 at the same time that counter 38 operates relay 40 and the call signal, i.e. the bell of set 19, Fig. 1, will be actuated to notify the operator at the receiving station that the assigned code number has been received.

Thus it is apparent that detector 34 and counter 38 step along together if all integers are appropriate and in proper sequence and close their respective relays 21 and 40 simultaneously. However if any received integer of the assigned code number is not in proper sequence, detector 34 does not step, but counter 38 does, thus getting "ahead" of detector 34. This prevents possible false operation by, for example, a call code corresponding to the assigned code number except that it has one or more extra integers which, while being integers included in the assigned code number, are not in appropriate sequence.

Figure 3:
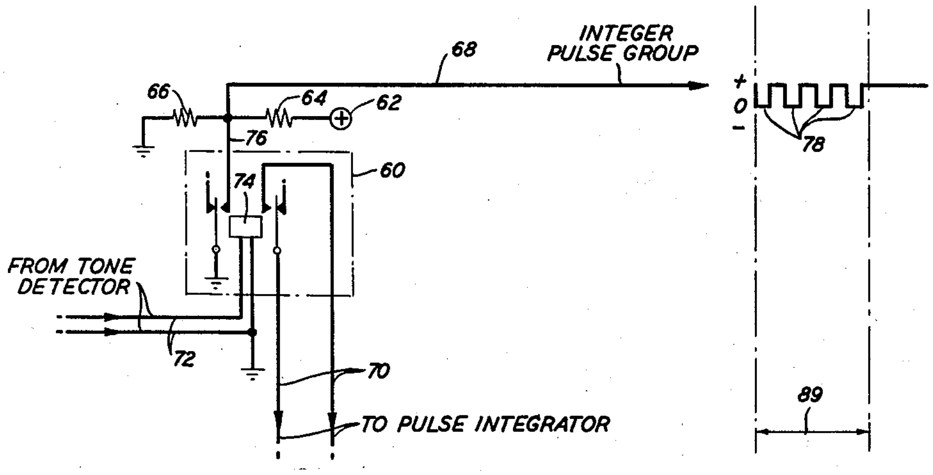
Fig. 3 is an electrical schematic diagram of a pulse distributor circuit for transmitting the integer pulse groups to the integer sequence detector and integer counter circuits.

In Fig. 3 an electrical schematic circuit of the "pulse distributor" is shown. It comprises a relay 60 which responds to the pulses from the tone detector 17 of Fig. 1, applied via leads 72 to control winding 74, by closing two pair of normally open electrical contacts. A first pair of these contacts is connected to lead 76 and a second pair to leads 70, respectively, as shown. A suitable source of direct current voltage, not shown, has its positive terminal connected to terminal 62 and its negative terminal connected to ground. A voltage divider comprising the series connected resistors 64 and 66 is connected between terminal 62 and ground. The closing of the first mentioned pair of contacts of relay 60 short circuits resistor 66 thus reducing the voltage on lead 68 to zero (or ground). Thus for a train of four positive pulses applied to leads 72 there will appear on lead 68 the train of four inverted pulses 78, shown to the right of lead 68, which vary between a predetermined positive value and zero. The significance of the interval 89 indicated at the right of Figs. 3 and 4 will be explained in detail in connection with the operation of the circuit of Fig. 4. The inverted pulses 78 are introduced into analyzer 32 of Fig. 2. In a similar manner the closing of the other pair of contacts of relay 60 interconnects the two leads 70. These leads go to the pulse integrator circuit, an electrical schematic diagram of which is shown in Fig. 4.

In Fig. 4 the leads 70 from the pulse distributor of Fig. 3 are connected across the resistor 86 which is shunted by the capacitor 84. A source of direct current voltage, not shown, has its positive terminal connected to terminal 80 and its negative terminal grounded. Connected between terminal 80 and ground in series relation is resistor 82, the previously mentioned resistor 86, and the winding of relay 88. The combined values of resistors 82 and 86 are such that insufficient current to operate relay 88 will flow through the relay winding after condenser 84 has been fully charged. The closure of the above-described pair of contacts of relay 60 of Fig. 3, however, short circuits resistor 86 and discharges condenser 84 and this occurs each time a pulse from tone detector 17 is applied to leads 72 of relay 60 of Fig. 3.

The function of resistor 82 is to appropriately fix the charging interval of capacitor 84 and also to limit the current to a reasonable value when resistor 86 is shorted as above described. With resistor 86 shorted, the current through the relay 88 is ample to operate this relay. Also, for a period following the removal of the short circuit across resistor 86, current to recharge capacitor 84 will flow through the relay winding of relay 88 of sufficient amplitude to prevent the relay from releasing.

The circuit design is such that the relay 88 will remain operated following the removal of the short circuit across resistor 86 for a period slightly longer than the interval between successive pulses (i.e. slightly longer than the interval occupied by an individual pulse) of an integer pulse group of the pulse codes employed by the overall selective signaling system.

This means that when an integer pulse group is received over leads 72 of Fig. 3, relay 88 of Fig. 4 will be operated by the leading edge of the first pulse (relayed over leads 70) and will remain operated for the entire interval occupied by the complete pulse group plus an additional period slightly longer than the time occupied by a single pulse of the pulse group. This is the interval 89 indicated to the right of both Figs. 3 and 4, the integer pulse group received being assumed to consist of four pulses 78 as shown opposite Fig. 3.

The operation of relay 88 removes a connection to ground from the junction between resistor 94 and capacitor 92. It also removes a connection to ground from the junction between resistor 98 and capacitor 97 so that when relay 88 is operated capacitor 92 is charged from a direct current source, not shown, the negative terminal of which is grounded and the positive terminal of which is connected to terminal 81. The charging circuit includes resistors 90 and 96.

Likewise, with relay 88 operated, capacitor 97 is charged from a similar direct current source, the positive terminal of which is connected to terminal 102 and the negative terminal of which is grounded, the charging current in this instance flowing through and being limited by resistors 100 and 108.

Resistors 96 and 108 are shunted by diode rectifiers 104 and 106, respectively, as shown. These rectifiers substantially short circuit their respective associated resistors and the outputs to leads 110 and 112, respectively, during the charging of the capacitors but offer very high impedance to the discharge currents of their respective capacitors. Accordingly, it is seen that resistors 94 and 96 and 98 and 108 largely control the discharge times of their respective associated capacitors while resistors 90 and 94 control the peak amplitude of the reset pulse A and resistors 98 and 100 control the peak amplitude of the stepping pulse B. Thus it is apparent that the overall circuit of Fig. 4 provides two negative pulses 48 and 50, known as the reset pulse A and the stepping pulse B, respectively, which appear on leads 110 and 112, as indicated to the right of Fig. 4, these pulses occurring simultaneously and at the end of the above-described interval 89, i.e. at the instant relay 88 releases. The reset pulse A is of substantially twice the amplitude of stepping pulse B for reasons which will presently become apparent.

In Fig. 5 there is shown in electrical schematic diagram form a specific circuit arranged to perform the functions of the integer analyzer, the integer sequence detector and the integer counter, which functions have been generally described hereinabove, particularly in connection with Fig. 2.

The circuit of Fig. 5 employs three cold cathode stepping tubes 210, 220 and 230, of the type well known to those skilled in the art, which comprises a gas-filled electronic device having, for example, twenty cathodes arranged in a circle and positioned under a common anode and a twenty-first or "starting" cathode placed just outside the ring. These tubes are illustrated in a linear schematic form to facilitate the diagrammatic representation of their associated circuits.

Basically, each tube can be thought of as a group of diodes placed in a common gas-filled envelope with their anodes directly coupled to each other. As in the case of a single diode, the gas between the anode and any one of the cathodes ionizes when the voltage between them reaches the breakdown level.

In normal operation, ionization glow occurs between the anode and only one cathode of the multicatode tube.

Pulse counting is readily accomplished by this tube because the glow discharge is easily caused to transfer or step from one cathode to the next by appropriate application of the pulses to be counted. The structure of the tube is such that it responds to each normal input pulse by stepping to the next cathode in one direction only. The discharge can be caused to return from any other cathode to the starting cathode (i.e. it can be "reset" to count the next pulse group) by applying an appropriate pulse to the starting cathode. Although this tube has numerous and varied other applications, for the purposes of the circuit being described, as will presently become apparent, it is used essentially as a simple pulse counter.

As a counter, it functions as a type of electronic switch analogous to a single-pole eleven-position mechanical rotary stepping switch. More detailed descriptions of the structureal features and operational characteristics of this type of tube are given in United States Patents 2,575,370 and 2,575,372, both granted on November 20, 1951 to M. A. Townsend, assignor to applicants' assignee, and also in an article entitled "Construction of Cold-Cathode Counting or Stepping Tubes" by M. A. Towsend, published in Electrical Engineering, volume 69, pages 810 to 813, inclusive, for September 1950. The use of a plurality of these tubes as a decimal counter from the integer one to the three integer number 999, inclusive, is disclosed and described in detail in United States Patent 2,635,810 granted April 21, 1953, also to Townsend. The salient features of this type of tube and its operating characteristics are described succinctly in an article entitled "Cold Cathode Counting Tube" by D. S. Peck, published in the Bell Laboratories Record, volume 31, for April 1953, starting at page 127. The auxiliary anode often included in the tube as supplied commercially is not employed in the specific embodiment of the invention illustrated in the drawings for the purpose of exemplifying the present invention. A suitable tube for the purposes of the present invention is manufactured by the Western Electric Company, Inc., under the code number 6167.

As illustrated in Fig. 5, considering first tube 210, the first or extreme left cathode is the normal (starting) or "NORM" cathode (cathode just outside the ring as mentioned above). The second cathode and alternate cathodes further to the right thereof are designated B1, B2 through B10, inclusive, respectively, as shown. They are connected together by the common conductor 211 which serves as the input for the integer pulse groups. This arangement effects the successive stepping of the glow discharge from the NORM cathode to cathodes K1, K2 through K10, inclusive, respectively, by the application of the negative pulses of the integer pulse groups. The cathode reached in any specific instance, of course, depends upon the number of pulses in the particular integer pulse group being counted. Each negative input pulse of the integer pulse group steps the discharge to the right to the next adjacent K cathode.

The K cathodes K1 through K10, inclusive, and the NORM cathode are each connected in series with one or more electrical impedances to ground and successively become outputs of the tube if and when the glow discharge is transferred to them in the operating cycle performed.

At the termination of each integer pulse group interval as described in connection with the pulse integrator circuit of Fig. 4, a negative pulse 48, designated reset pulse A, is applied over lead 110 to the NORM cathode and is of sufficient amplitude to cause the transfer of the glow discharge from any other cathode of the tube back to the NORM cathode, thus resetting the tube in readiness for counting the pulses of the next integer pulse group received.

A varistor 240 is included in the lead connecting the NORM terminal to ground in order to present a higher impedance to ground for the negative reset pulse than that presented by the normal impedance comprising resistance 241 shunted by capacitor 250 of the circuit.

The cathodes K1 through K10, inclusive, of tube 210 are connected, either by resistive paths to ground at tube 220, or by a resistive path to lead 245 which is connected to ground through the winding of relay 24. More specifically, for the particular arrangement illustrated in Fig. 5, cathode K2 of tube 210 connects through resistors 263 and 273 to ground at tube 220, cathode K8 connects through resistors 261 and 272 to ground at tube 220, and cathode K9 connects through resistors 260 and 271 to ground at tube 220. Also, cathodes K1, K3 and K10 connect through resistors 242, 243 and 244, respectively, to the above-mentioned conductor 245.

Capacitors 250 through 255, inclusive, are each connected in shunt with a specific portion of one of the resistive paths just mentioned, respectively, as shown, and act to maintain the voltages established during the switching operations involving their respective resistive paths for a short time to facilitate the resetting of the gaseous discharge from any of these cathodes to the NORM cathode and as well to facilitate stepping the sequence detector tube 220, if appropriate, at the termination of an integer pulse group.

Cathodes K2, K8 and K9 correspond to integers employed in the code assigned to the receiving station using the specific circuit arrangement shown in Fig. 5. Their proper sequence is 982 as evidenced by the order from left to right in which they are connected to successive cathode circuits of tube 220 (constituting the integer sequence detector).

Cathodes K1, K3 and K10 correspond to integers not employed in the code assigned to the specific receiving station being considered and, consequently, if the incoming integer pulse group contains either one, three or ten pulses, relay 42 will be energized, thus applying the reset pulse A from lead 110 through condensers 232, as shown, to the NORM cathodes of tubes 220 and 230 as well as to that of tube 210 shortly after the termination of the integer pulse group as described in detail hereinabove.

The same action will of course take place if an integer pulse group contains four, five, six or seven pulses, respectively, since these too are integers not employed in the assigned code number 982. To avoid further complication of the drawing, the details of these positions, i.e. K4 through K7, inclusive (which in all essentials duplicate those of cathode K3, for example), have been omitted. As previously stated hereinabove, the integer one is reserved to clear the discriminator and is always included as the first integer of each code number for that purpose.

Appropriate input voltages for the stepping tubes 210, 220 and 230 (in a typical circuit these biases would be, for example, 15 volts positive) are provided by direct current sources, not shown, the positive terminals of which sources are connected to terminals 202, 216 and 224, respectively, the negative terminals of these supply sources being grounded.

The anodes of the three tubes 210, 220 and 222 connect through anode load and current limiting resistors 212, 218 and 222, respectively, to terminal 214 to which a further direct current source not shown has its positive terminal connected, its negative terminal being grounded. In a typical case, terminal 214 would, for example, be at a potential of 300 volts positive. This voltage must suffice to maintain a gaseous discharge if and when established but must be insufficient to initiate such a discharge unless the potential of a cathode is reduced, i.e. driven further negative as by the application of a negative pulse. Such pulses in a typical case should be, for example, 15 volts, or more, negative with respect to ground. As in the case of tube 210, the NORM cathode circuits of tubes 220 and 230 also include diodes 274 and 275, respectively, in series with resistors 271 and 276, respectively, to insure a high impedance to ground for the negative reset pulse at their respective inputs.

With respect to tubes 220 and 230, it is apparent that their respective input connections (to their B cathodes) are connected through capacitors 228, as shown, to conductor 112 over which negative pulse 50, designated as the stepping pulse B, is provided, following each integer pulse group interval as described in detail above.

In order that the stepping pulse reaching the input of tube 220 will operate to step the gaseous discharge from its NORM cathode to its K1 cathode, it is necessary that the analyzer tube 210 be applying voltage to resistor 271 simultaneously, i.e. for the specific case illustrated in Fig. 5, the integer pulse group just counted must have consisted of nine pulses. If such is the case, the discharge will be transferred to cathode K1 of tube 220. Otherwise it remains at the NORM cathode of tube 220.

On the other hand, tube 230 will respond to the stepping pulse alone and its gaseous discharge will be transferred one position to the right (i.e. from the NORM cathode to the K1 cathode, from the K1 cathode to the K2 cathode, and so on) for each stepping pulse received. The associated resistors 276 through 278 and capacitors 280 through 282 assist in maintaining the proper voltage relations in their respective circuits for the required operational changes of the tube 230.

It should be noted that the reset pulse A (48) must be of sufficiently greater amplitude than the stepping pulse B (50) so that in instances in which both pulses are applied at the same time to tubes 220 and 230, the reset pulse will take control, resetting the tubes, the stepping pulse in such instances being ignored by tubes 220 and 230.

For the assigned code of 982 then the NORM cathode and cathodes K1 and K2 of tube 220 connect through resistors 271, 272 and 273 to ground and cathode K3 connects through the winding of relay 21 to ground. If integer pulse groups of nine, eight and two pulses, respectively, are received in the order given, tube 220 will respond by stepping after each pulse group interval one step to the right and thus arrive at cathode K3, whereupon relay 21 will be operated and the call signal (or bell) of the receiving station will be operated. In this case, tube 230 will step regularly along with tube 220 and in similar manner operate relay 40 simultaneously with the operation of relay 21.

In order to reset the system so that it is in readiness to respond to a further repetition of the assigned code number, a new reset pulse A (48) must be applied to lead 110. This may be accomplished in a number of ways, as previously described, one of which is to apply a momentary short circuit across resistor 86. Should all received integer pulse groups be those of the assigned code, but one or more of them be not in its proper sequence or order, then, obviously, tube 220 will not step or advance in response to the stepping pulse B for the integers not in proper order, but tube 230 will and will thus be one or more steps ahead of tube 220. In such a case tube 230 will operate relay 40 before tube 220 can operate relay 21, no call signal will be operated, and the circuit will be reset and ready to respond to further code number calls.

The functions of the circuit of Fig. 5 can accordingly be recapitulated as follows:

Tube 210 counts the number of pulses in each integer pulse group. If the integer indicated by the number of pulses counted is not part of the assigned call code, tube 210 operates relay 42 and the reset pulse restores tubes 220 and 230 to their initial or NORM condition. If the integer is part of the assigned code, tube 210 passes a signal to tube 220 to a position at tube 220 corresponding to the proper sequence of that integer in the assigned code. If the sequence of the integer is correct, the signal from tube 210 cooperates with the stepping pulse B to step tube 220 one position. Otherwise tube 220 does not step. Tube 230 steps one position to the right shortly after the termination of each integer pulse group provided the pulse group corresponded to any integer of the assigned code, regardless of whether the integer is in its proper sequence or not.

If all integers of the assigned code are received in their proper sequence, tubes 220 and 230 step along together and after receiving the last integer of the assigned code the tubes operate their respective relays 21 and 40 simultaneously and operation of relay 21 causes the call bell to ring.

Additional integers corresponding to integers of the assigned code but out of proper sequence cause tube 230 to step but not tube 220, the result being that tube 230 gets ahead of tube 220 by one step for each such integer and therefore operates relay 40 before relay 21 is operated. This results in resetting both of the tubes 220 and 230 and the call bell is not energized.

Numerous and varied other arrangements within the spirit and scope of the principles of the invention will readily occur to those skilled in the art. No attempt has been made to exhaustively illustrate all such arrangements. The above-described arrangement is, of course, illustrative only.

What is claimed is:

1. Pulse code recognition apparatus responsive to a predetermined plurality of pulse groups, each group comprising a predetermined number of pulses, the groups occurring in predetermined sequence, the apparatus comprising a first means for counting the number of pulses in each group and forwarding an indication when the number of pulses corresponds to a group of the code together with an indication of the correct sequential position of the pulse group in the code, means for generating a stepping pulse and a resetting pulse following the termination of each pulse group, means for applying the resetting pulse to the first counting means following the counting of each pulse group, a second means for counting pulses responsive to the combination of the information forwarded by the first counting means and the stepping pulse to step one position forward only when the forwarded information indicates that the pulse group is in correct sequential order, call signal means responsive to the second pulse counting means when the latter has stepped forward the number of positions corresponding to the predetermined number of pulse groups, a third pulse counting means responsive to the stepping pulse to step one position forward for each pulse group received, and means responsive to said third pulse counting means to apply said resetting pulse to said second and third pulse counting means when the number of pulse groups received corresponds to the number of pulse groups in the predetermined plurality of pulse groups.

2. The apparatus of claim 1 and means connecting to said first pulse counting means to apply said resetting pulse to said second and said third pulse counting means whenever a group of pulses counted by said first pulse counting means does not correspond to an integer of said preassigned code number.

3. In a selective receiver for a signaling system employing a series of groups of electrical impulses each group representing an integer of a code number, a plurality of gaseous conduction devices each having an anode and a plurality of cathodes and responsive to electrical impulses applied thereto to advance the conductive path therethrough step by step so that said path exists between said anode and successive ones of said cathodes, means for producing a stepping pulse at the termination of each received integer pulse group, means for applying each integer pulse group to a first of said conduction devices, circuit connections from those cathodes of said first conduction device corresponding to the integers of the code to be identified to a second of said conduction devices to render said second device responsive to said stepping pulse when and only when the integer pulse group is received in its correct sequential order, second circuit connections for applying said stepping pulses to said second device to cause said second device to advance to its conduction path only when rendered responsive over said circuit connections from said first device, a signaling device connected to a cathode of said second conductive device to be operated by the conductive path thereof when advanced the number of steps corresponding to the number of integers in said code by the operation of all of said first circuit connections, reset means associated with those cathodes of said first device other than those associated with said first circuit connections for resetting said second device when the conductive path of said first device is advanced at the termination of an integer pulse group to any of said other cathodes of said first device, connections for supplying said stepping pulses to a third of said conduction devices and, a second reset means connected to a cathode of said third device corresponding to that cathode of the second device to which said signaling device is connected, for resetting said second and third devices when the conduction path is stepped to said cathode of said third device.

4. Recognition apparatus for selecting a specific preassigned code number comprising a plurality of specific integers arranged in a specific sequence as represented by a like plurality of pulse groups, the number of pulses in each group corresponding to the numerical value of the integer it represents, respectively, the pulse groups being arranged in the same sequential order as the integers they respectively represent, said apparatus comprising a first means for counting the number of pulses in each group, a second means for counting the number of pulse groups received in succession, a third means for counting the number of pulse groups representing integers of said preassigned code received in correct sequential order, a fourth means responsive to said last stated third means for operating a call signal only when pulse groups representing all integers of said preassigned code are received in correct sequential order, and a fifth means responsive to the second means for resetting the second and third means when the number of pulse groups received corresponds to the number of integers of the specific preassigned code number.

5. The apparatus of claim 4 and means for resetting said second and third means whenever a pulse group not corresponding to an integer of said code is received.

References Cited in the file of this patent

UNITED STATES PATENTS

| | | |
|---|---|---|
| 2,452,052 | Hibbard | Oct. 26, 1948 |
| 2,563,127 | McGoffin | Aug. 7, 1951 |
| 2,648,831 | Vroom | Aug. 11, 1953 |